Oct. 18, 1932.  O. U. ZERK  1,883,281
LUBRICATING MEANS AND METHOD
Filed April 14, 1930
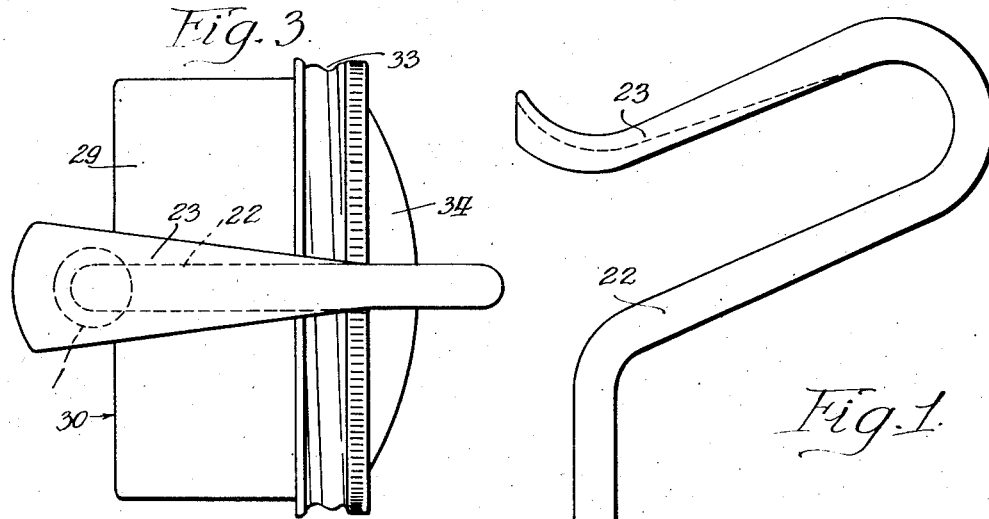
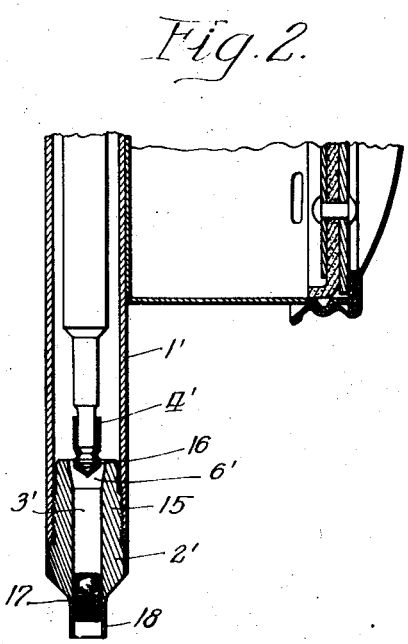
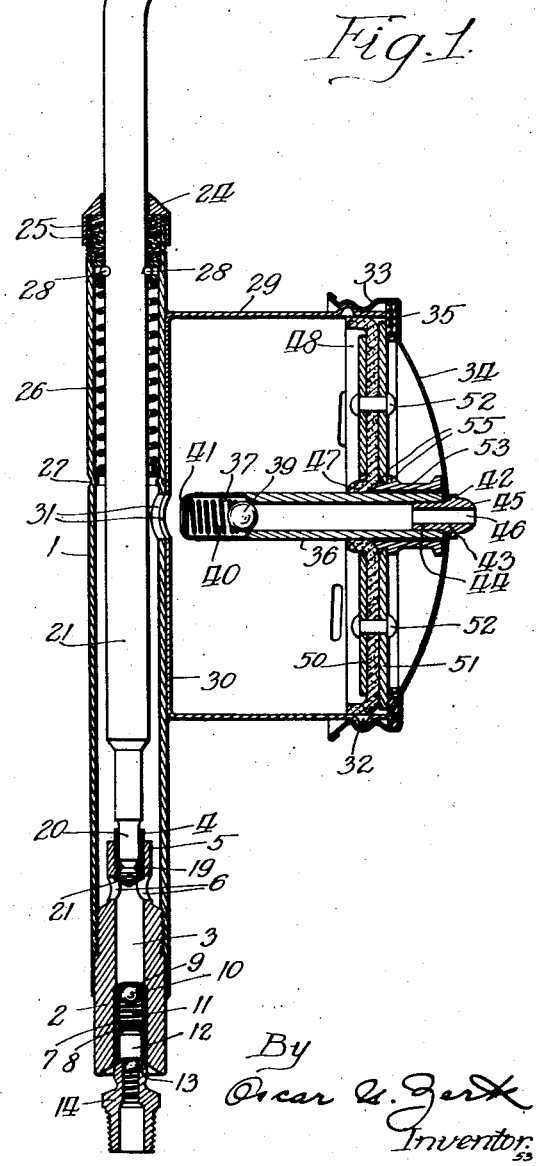
By Oscar U. Zerk
Inventor.

Patented Oct. 18, 1932

1,883,281

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING MEANS AND METHOD

Application filed April 14, 1930. Serial No. 443,991.

This invention relates to lubricating means and methods, and particularly to means and methods by virtue of which lubricant is supplied to and from a lubrication gun.

In lubrication by means of lubricant dispensing guns, two general types of apparatus for communicating lubricant from the gun to bearings are commonly employed. First, there is the interlocking type employing a coupling by means of which a nozzle on the gun may be temporarily interlocked during the lubricating period, to a lubricant receiving nipple on an element of the bearing, to be lubricated; and second, there is the contact type of coupler whereby the lubricating gun nozzle and the lubricant receiving nipple are temporarily maintained in lubricant communicating contact by pressure which is manually exerted between the nozzle and the nipple.

While my invention, broadly considered, is adaptable for use in connection with either of the above named types of apparatus, I choose to illustrate and describe herein apparatus embodying my invention in which couplers of the contact type are employed.

My present invention has a particular application to the type of apparatus illustrated in my Patents No. 1,748,818 issued February 25, 1930, No. 1,748,819 issued February 25, 1930, and No. 1,748,727 issued March 4, 1930, and in my co-pending applications Serial No. 430,720 filed February 24, 1930 and Serial No. 435,761 filed March 14, 1930.

In the above issued United States Letters Patent and pending applications I have illustrated a new system of manufacturing lubricating guns, whereby, in the quantity production of guns having lubricant reservoirs of different capacities, the construction of the various sizes of guns have been standardized to such an extent that substantially all parts of the various sizes of guns are the same, excepting only that the lubricant reservoirs therefor which may vary in size, are provided, laterally attached to a long slender dispensing tube of the gun.

In the manufacture of lubricant guns it is often necessary to design the same in the simplest possible manner in order that they may be sold at the lowest possible price to automobile manufacturers who are manufacturing and selling cars at low prices. Manufacturers of such low priced cars would, doubtless, use the simplest and most inexpensive type of nozzle and piston cylinder combination as illustrated in Figure 5 of my co-pending application Serial No. 430,720 filed February 24, 1930, which though possessing many advantages over prior constructions, does not contain the additional advantages illustrated in the nozzle construction shown in Figure 3 of the said former pending application. It would, therefore, be desirable to have these two considerably different nozzle and piston cylinder combination units in one and the same grease gun without impairing in any way the perfect workability of the grease gun.

There are many automobile owners and also many small greasing station owners who would prefer to fill a grease gun of the type illustrated in this application or illustrated and described in the above mentioned pending applications and patents, wherein a lubricant reservoir is laterally attached to the long slender tube of the lubricant gun with lubricant, without removing the cap from the lubricant reservoir.

In my United States Letters Patents Nos. 1,708,041, 1,720,041, 1,720,874, and certain of my pending patent applications, means are described for introducing lubricant into a lubricant reservoir, the axis of which is coaxial or parallel with the axis of the pump cylinder.

The apparatus of my present invention involves the use of a feeder element which is attached to a lubricant reservoir, laterally connected to a long slender dispensing tube of the grease gun. Since in such a construction there is not required a piston rod so disposed as to interfere with the feeder element of the gun, a very simple, and effective, construction is provided.

An object of my invention is to provide improved means for re-charging lubricant reservoirs of guns of the above described type wherein the reservoir is laterally attached to the dispensing barrel of the lubricant gun, without the necessity of detaching the cap of the lubricant reservoir, and independently of the location of the lubricant inlet.

Another object of my invention is to provide improved means for supplying lubricant to a gun through a tubular element thereof protruding through the follower piston, thereof.

Another object of my invention is to provide an improved tubular means for a lubricant gun, providing check valve means, disposed therein, remotely from a lubricant receiving nipple therefor, wherein the check valve may respond to charging lubricating pressures of very low value.

Another object of my invention is to provide for lubricating apparatus of the above type a loose connection between a lubricating tubular element and the reservoir cap therefore, to prevent excessive friction between the piston follower, the tubular element, and the reservoir walls.

Another object of my invention is to effect ready interchangeability between substantially different nozzle and or piston cylinder constructions without adversely affecting the action of a lubricating gun, to which they are applicable.

Another object of my invention is to provide improved means to notify the operator when the reservoir is filled, to prevent excess lubricant opening the check valve in the nozzle, to escape therefrom.

Another object of my invention is to provide improved means to prevent the pulling away of the reservoir cap of a lubricant reservoir laterally attached to the lubricant conduit, during a recharging period.

Other objects of my invention and the invention itself, will be readily understood from a following description of an embodiment thereof, and from the accompanying drawing referred to therein, which illustrate the said embodiment.

In the drawing:—

Fig. 1 is a view mostly in longitudinal, medial, section, of a lubricating gun which is an embodiment of my invention.

Fig. 2 is a fragmentary like view of a modification thereof.

Fig. 3 is an end elevational view of the said embodiment.

Referring now to the drawing, and first to the Figures 1 and 3, the lubricant gun illustrated therein is of the general type shown in my aforesaid issued patents and pending applications wherein the gun is characterized by the provision of a relatively long slender dispensing tube, supporting by an intermediate portion and exteriorly thereof, a laterally extending, preferably shallow, lubricant reservoir which is preferably cup-shaped.

Referring to Fig. 1 the tube is shown at 1 and supports a forwardly extending high-pressure dispensing element 2, forming a lubricant dispensing nozzle, a check valve chamber, and a high-pressure pump cylinder.

The element 2 is provided with a longitudinal bore 3 forming a cylinder within which a piston 4 is adapted to be reciprocated, the bore communicating with the interior of a tubular element press-fitted in a slightly enlarged portion of the said bore towards the anterior end of the nozzle element. Rearwardly of the cylinder portion 3 of the bore, the bore is extended rearwardly to provide by its walls, a guide for the piston 4. The tubular element 2 is exteriorly reduced in its rear-most portion 5, which provides by its inner walls the piston guide, and the portion 5 is provided with a pair of lubricant receiving apertures 6 through its lateral walls.

The tubular element 7, press-fitted in the forwardly disposed slightly enlarged portion of the bore 3, is provided with a pair of inwardly extending annular flanges 8 and 9, longitudinally spaced from each other, and engaging a valve ball 10 and valve spring 11, to retain the ball seated against the flange 9 by pressure of the compressed spring 11. The lateral walls of the tubular element 7, are relatively thick, in portions intermediate the said flanges, but are relatively thin in the forwardly disposed portion 12 which projects from the flange 8 to the mouth 13 of the nozzle 2, to form a relatively thin walled, resilient contactor, for dispensing lubricant without leakage to a lubricant receiving nipple, such as that shown at 14, with the inlet end of which the forward end of the contactor is engaged.

The contactor shown is of the general type disclosed in certain of my co-pending previously filed applications for patent, a typical one of which is Serial No. 430,720, filed February 24, 1930 to which reference may be had for a full disclosure of its characteristic mode of operation, the present invention, however, not being limited to any particular type of dispensing nozzle.

For instance Fig. 2 shows a variant form of nozzle element at 2′ screw-threaded by its stem 15 interiorly into the forward end of the tube 1′ wherein the reduced guide portion 5 is omitted the bore 3′ having a flared inlet 1′ serving to receive lubricant, and also to guide the head 16 of the piston 4′ to the bore of the high-pressure cylinder disposed between said inlet and a tubular valve and valve spring holder 17, which is press-fitted within the bore 3′ near its forward end, but spaced therefrom. The nipple engaging contactor 18, in this form of the nozzle element is integral forward tubular projection of the tubular nozzle element 2′, whose exterior diameter is so reduced as to make the lateral walls of the said tubular projection quite thin.

In this form the contactor tube 18 is not formed separately of a preferably harder, more resilient steel or like metal material, as in the embodiment of Fig. 1, but preferably in the variant form shown the entire element 2' must be made of a material suitable to the contactor functions.

The nozzle elements 2 and 2' are interchangeable, that is either may be screw-threaded by its stem portion into the internally threaded end of the tube 1, and will then cooperate with the piston 4.

The piston 4 is in the form of an elongated cup having an annular inwardly directed crimp in its lateral walls at 19 which is received about the reduced neck of the piston rod 20 which is provided with a terminal head 21, disposed within the head of the piston 4. The rod 20 preferably fits loosely within the piston, whereby the piston may oscillate to a limited degree on the rod, to effect alignment with the guiding walls of the bore 3.

The rod 20 is supported on the end of an enlarged rod element 21 which terminates exteriorly of the tube 1 in an obliquely inclined substantially U-shaped handle portion 22, the terminal arm 23 of which is widened and suitably rounded to make a comfortable hand grip thrust surface.

A cap 24 screw-threaded onto the rear end of the tube 1, through a central aperture of which the rod 21 projects, holds in place the plurality of packing washers 25 engaged with the rod and the walls of the tube to make a seal against inlet of air to the tube from its rear end.

A helical compression spring 26 encircles the rod 22, and is held in compressed condition between an inwardly crimped annular projection 27 of the tube and a set of projections 28 extending outwardly from the rod, against which a washer 28 is placed to form an abutment for an end of the spring. The spring 26 retracts the piston rod and piston to the positions shown in Fig. 1 after the rod and piston have been thrust forwardly to a more advanced position in the tube 1, and the cylinder bore 3 respectively.

The lubricant reservoir in the form of a relatively shallow cup 29 is rigidly affixed to an intermediate portion of the tube 1, by a diametrically inwardly grooved portion of its end wall 30, soldered to the outer surface of the tube. The said end wall portion and the contiguously disposed portion of the tube wall are apertured at 31 to effect communication of lubricant from the reservoir 29 to the interior of the tube 1.

The lateral walls of the reservoir cup 29 are spirally outwardly crimped near the rim of the cup, to provide an external screw-thread 32 engageable with the spirally crimped tubular flange 33 of the concave-convex cover cap 34, whereby the cover cap is removably secured to the cup. An annular gasket 35 disposed within the cap tubular flange, seated against an intraperipheral portion of the cap end wall effects a lubricant seal for the mouth of the cup.

A tubular stem 36 is rigidly carried on the cap 34, by its central portion, and projects from its concave face, to position it axially within the cup when the cap is positioned thereon.

The stem 36 is provided with a longitudinal bore enlarged at its free end, at 37 to provide a shoulder 38, forming a valve seat for a valve ball 39 pressed thereagainst by a helical compression spring 40 which is maintained compressed within the enlarged bore portion between the ball 39 and an inturned end flange 41 of the tubular stem.

A lubricant receiving nipple 43 provided with an intermediate radial flange 42, a tubular stem 44 and a lubricant receiving tip 45 preferably formed like the tip of the nipple 14 with a parti-spherical end surface and an axial bore 46 extending through said surface, is by its stem portion 44, projected through a central aperture of the cap 34, into press-fitted engagement with the tubular walls of the tube 36, near its end, and clamps the tube 36 onto the cap 34.

A piston is provided for the cylindrical walls of the cup 29, being longitudinally reciprocable therein, and provides a follower adapted to ride on the outer surface of the body of grease or oil lubricant contained within the cup 29, continuously, as the gun is used from time to time, drawing more and more lubricant from the cup, to deplete the supply.

The piston is provided with a cup-leather packing 47 having a peripheral tubular sealing flange 48, and an inner tubular sealing flange 49, the former engageable with the inner surfaces of the cup lateral walls, the latter engageable with the outer surface of the tube 36. A pair of centrally apertured metal disks 50 and 51 clamp the intermediate annular portion of the packing, there being an annular row of rivets 52 projected through the disks and packing to hold them together.

A tubular metal guide 53 is journalled for longitudinally reciprocation on the tube 36 and is rigidly secured by its radial flange 55 to the disk 51, extending through its central aperture.

It is now well known that lubricant is fed to the high pressure cylinders of a lubricant gun, such as the cylinder at 3, following a lubricant dispensing operation, when the piston such as at 4, is withdrawn from the cylinder, because of the very considerable reduction in pressure in the cylinder being communicated to the lubricant on the approach side of the cylinder, and there being atmospheric pressure on the outer side of the body of grease forcing it toward the lubricant receiving cylinder of reduced fluid pressure.

Lubricant is therefore drawn after each lubricating operation by the tube 1, from the cup 29 through the aperture 31, and the pressure of atmosphere in excess of the fluid pressure in the tube is exerted against the outer surface of the piston in the cup to cause it to press against the body of grease engaged by its inner side which is faced by the disk 50.

It is to be noted that this excess in pressure of atmosphere, in the embodiment described is also exerted against the surface of the valve ball 39 which closes the bore of the tube 36 by pressure of the spring 40, but the spring 40 is sufficiently strong as to resist any displacement of the valve ball which would otherwise be effected by atmospheric pressure, and which otherwise would permit air to be drawn from the inner end of the tube and to be carried through the body of grease, through the apertures 31, and thence to the bore 3 of the piston cylinders.

Such operation would be highly undesirable and would prevent the lubricant dispensing function of the piston and cylinder, being properly performed; therefore lubricant, by the provision of the spring 40, instead of air is supplied to the lubricant dispensing means.

After all of the lubricant has been dispensed from the cup, or depleted to any extent, the cup may be recharged with lubricant by presenting a nozzle of a lubricant dispensing apparatus, having for instance a manually operable contactor of the type shown at 12 Fig. 1, to the tip 45 of the nipple 43, with the tubular contactor engaging by an end portion, with the partispherical surface of the tip 45 to seal the nozzle and nipple against lost of lubricant, and then dispensing lubricant into the nipple 43, and thence through the tube 36, to the interior of the cup 29.

Such a lubricant dispensing apparatus will supply lubricant put under sufficient pressure that the valve ball 39 will be readily unsuited, against the pressure of the spring 40, which however will readily and promptly reseat the valve ball when the lubricant charging operation is completed.

Having thus described my invention in a specific embodiment I am aware that numerous and expensive departures may be made therefrom but without departing from the spirit of my invention.

I claim:—

1. A lubricant gun comprising a high pressure dispensing barrel, a reservoir cup secured laterally thereto by an end wall thereof, a cap for the cup, and a tubular feeder for the cup carried by the cap.

2. A lubricant gun comprising a high pressure dispensing barrel, a reservoir cup secured laterally thereto by an end wall thereof, a piston follower therein, a cap for the cup, and a tubular feeder for the cup carried by the cap projected through the follower.

3. A lubricant gun comprising a high pressure dispensing barrel, a reservoir cup secured laterally thereto by an end wall thereof, a piston follower therein, a cap for the cup, detachably interlocked with the mouth portion thereof, and a tubular feeder for the cup carried by the cap projected through the follower, said follower journalled thereon.

In testimony whereof I hereunto affix my signature this 11th day of April, 1930.

OSCAR U. ZERK.